APPARATUS FOR PROVIDING A DIGITAL AVERAGE OF A PLURALITY OF ANALOGUE INPUT SAMPLES

Filed Dec. 10, 1964

INVENTOR.
STANISLAW V. LAZECKI
BY Shenier & O'Connor
ATTORNEYS

INVENTOR.
STANISLAW V. LAZECKI
BY
Shenier & O'Connor
ATTORNEYS

United States Patent Office 3,441,720

Patented Apr. 29, 1969

3,441,720

APPARATUS FOR PROVIDING A DIGITAL AVERAGE OF A PLURALITY OF ANALOGUE INPUT SAMPLES

Stanislaw V. Lazecki, Stamford, Conn., assignor to United Aircraft Corporation, East Hartford, Conn., a corporation of Delaware Filed Dec. 10, 1964, Ser. No. 417,366
Int. Cl. G06j 1/02
U.S. Cl. 235—150.5 8 Claims

ABSTRACT OF THE DISCLOSURE

A digital filter for providing a digital average of a plurality of analog input samples. An incoming analog sample is subtracted from the analog of an average value of a plurality of samples, the digital equivalent of which average is stored in a register. The digital equivalent of the analog difference is divided by a selected factor and applied to the register to update the digital average.

My invention relates to a digital filter and more particularly to apparatus for providing a moving digital average of a plurality of analog input samples.

There are some instances wherein data which must be handled appears as a plurality of analog samples of short duration. The envelope of the set of samples contains an undesired frequency component. For example, in terrain clearance systems elevation information may be supplied in that form. For proper operation of the system this should be handled in the form of averaged data. While that might be achieved by passing the analog samples through a filter and then converting the resultant analog signal to a digital signal, this arrangement is not as accurate as is desirable.

I have invented a digital filter which produces a moving digital average of discrete analog input samples. My digital average may be made up of as great a number of samples as is desired. The average is a highly accurate digital representation of the average of the number of analog input samples under consideration. My system achieves this result in a rapid and expeditious manner.

One object of my invention is to provide a digital filter for producing a moving digital average of a plurality of analog input samples.

Another object of my invention is to provide a moving digital average which may be made up of as great a number of input samples as is desired.

A further object of my invention is to provide a digital filter for producing a moving digital average of an analog input in a rapid and expeditious manner.

Other and further objects of my invention will appear from the following description.

In general my invention contemplates the provision of a digital filter in which an incoming analog sample is subtracted from the analog of an average value of a plurality of samples, the digital equivalent of which average is stored in a register. I divide the digital equivalent of the analog difference by a selected factor and apply the result to the register to update the digital average contained therein.

In the accompanying drawings which form part of the instant specification and which are to be read in conjunction therewith and in which like reference numerals are used to indicate like parts in the various views.

Figure 1:
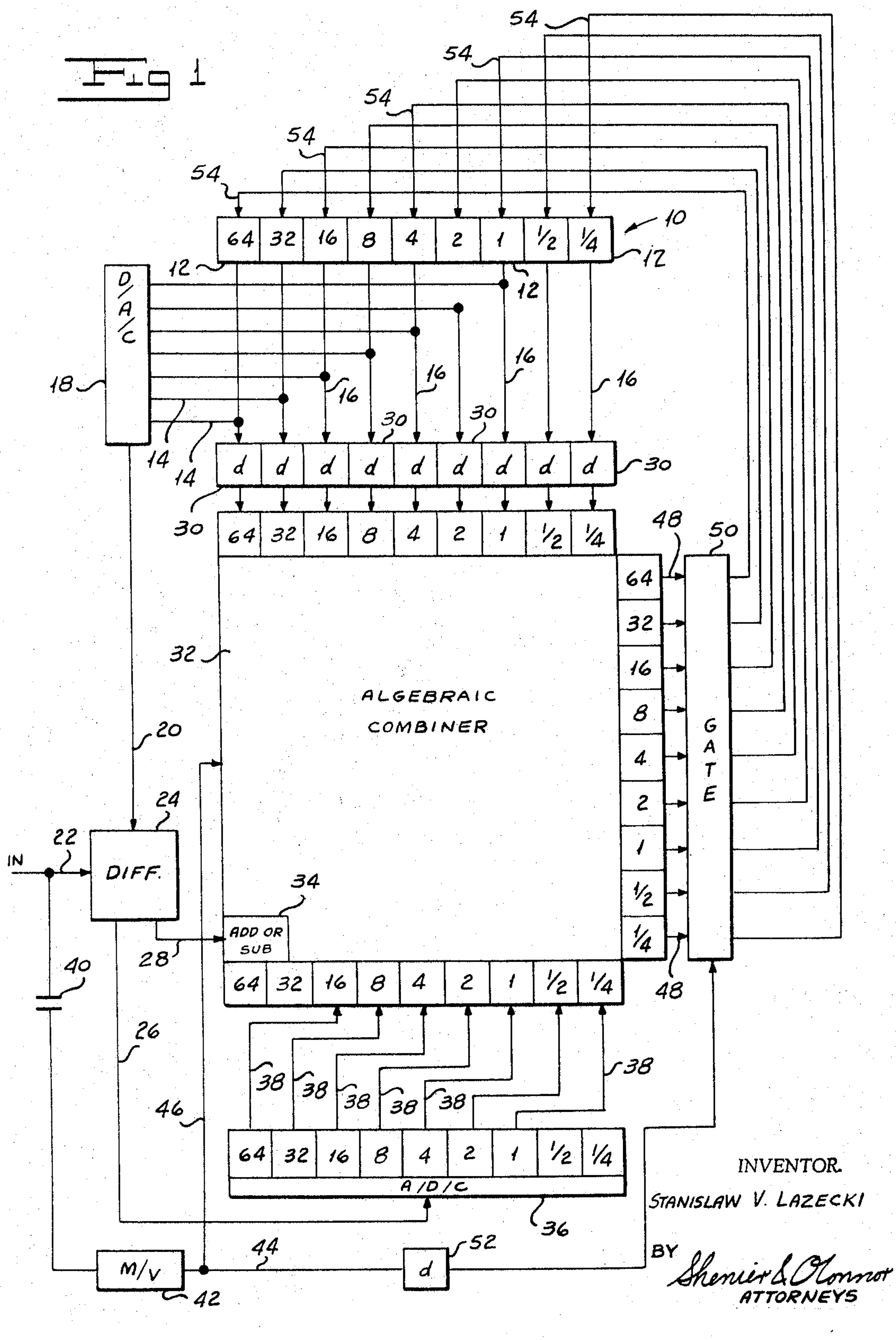
FIGURE 1 is a schematic view of my digital filter.

Referring now to FIGURE 1 of the drawings, a storage register indicated generally by the reference character 10 comprises a number of places 12 adapted to store the respective bits of a digital representation of a moving average of a plurality of analog input samples in a manner to be described.

I provide means for developing a difference signal representing the difference between a new analog input sample and the analog of the moving average, the digital representation of which is carried in the register 10. A plurality of channels 14 couple the output channels 16 of the register 10 to a digital-to-analog converter 18 which may be any suitable type known in the art such, for example, as those shown and discussed at pages 494 to 499 of "Digital Computer Components and Circuits" by R. K. Richards, published by D. Van Nostrand Company, Inc., New York (1957). Converter 18 provides an output channel 20 with a representation of the analog of the presently stored digital average in the register 10.

An input channel 22 applies the next sample to an analog algebraic subtractor 24 which produces an output on a channel 26 representing the magnitude of the difference between the signals on channels 20 and 22. Another channel 28 provides a signal indicating the sign of the difference between the two inputs to the device 24. As will be explained hereinafter, the signal on channel 28 determines whether or not the moving average is increased or decreased as it is updated.

Respective delay networks 30 couple the channels 16 to one digital input section of an algebraic combiner 32 of any suitable type known in the art which is adapted to add or subtract two digital inputs applied thereto as determined by the sign signal on channel 28 which is applied to the add or subtract determining section 34 of the combiner 32. For example, an adder-subtractor of the type discussed at pages 121 to 124 of "Arithmetic Operations in Digital Computers" by R. K. Richards, published by D. Van Nostrand Company, New York (1955) might be used.

I apply the analog difference signal on channel 26 to the input of an analog-to-digital converter 36 such, for example, as one of the types shown and discussed at pages 487 to 491 of Richards, supra, adapted to produce an output representing the digital value of the difference signal on output channels 38. I apply the digital output on channels 38 to the other input section of the combiner 32. In so doing I shift the output down a number of places determined by the number of samples I have used in making up the average contained in the register 10. By way of example, where I store an average made up of four samples, I shift the digital output on channels 38 down two places to in effect divide the representation by four.

A capacitor 40 couples the input sample to a monostable multivibrator 42 to produce an output pulse on a channel 44. A channel 46 applies that pulse to the combiner 32 to initiate its operation to provide a digital output on channels 48 representing the updated moving average. A gating arrangement 50 is adapted to apply that output to the register 10 to update the average. In order to afford the combiner 32 sufficient time to perform its operation, a delay network 52 applies the pulse on channel 44 to the actuating terminal of gating arrangement 50 to permit the outputs on channel 48 to move into the register 10 on channels 54.

Figure 2:
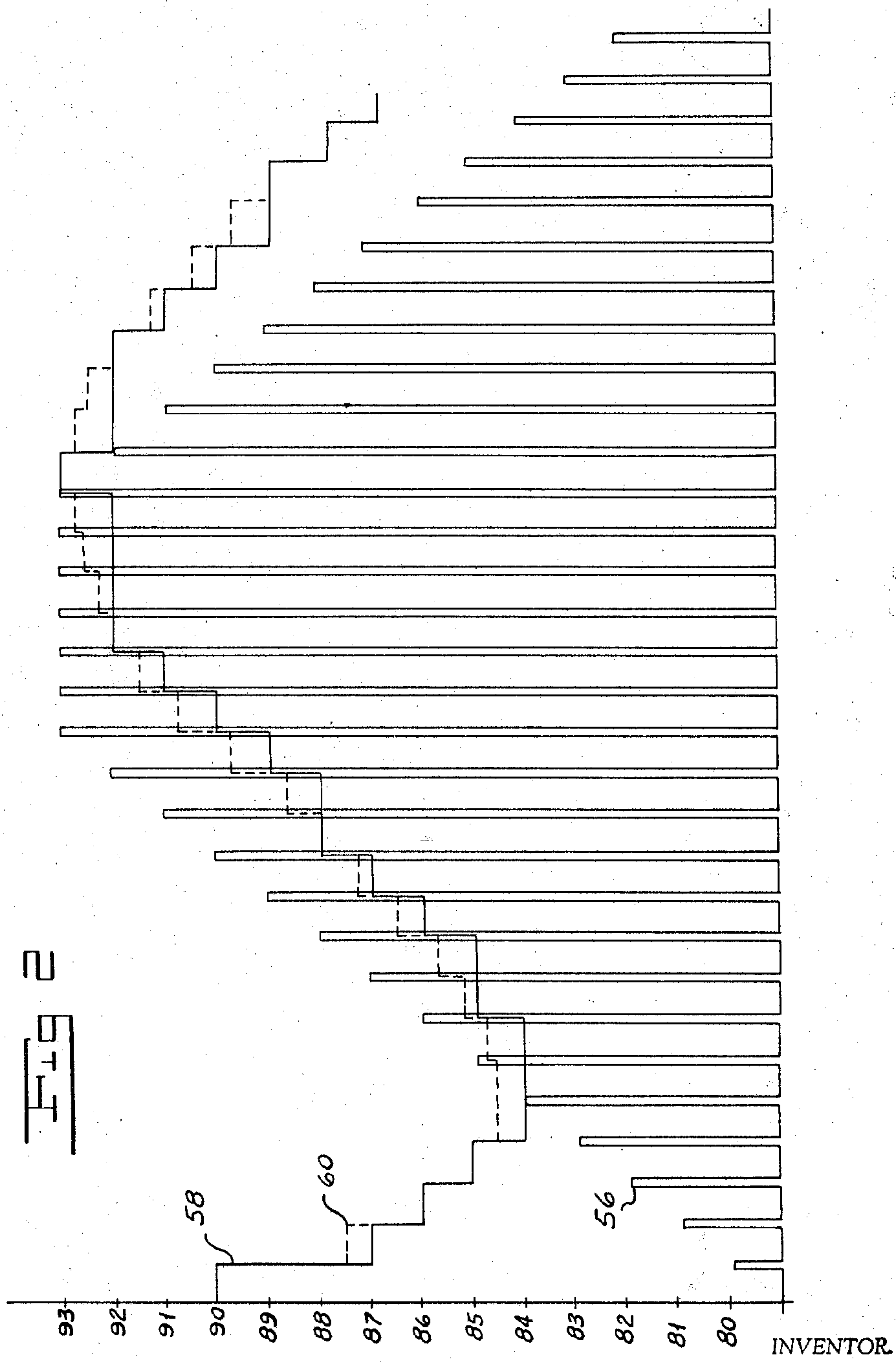
FIGURE 2 is a diagrammatic view illustrating incoming information and the average provided by my digital filter in response to incoming samples.

The manner in which my arrangement operates to provide a moving digital average of a plurality of analog information samples can best be understood by considering a particular example. Referring to FIGURE 2 I have shown a series of samples 56 occurring at spaced intervals along a time base. In my example I have selected an extreme case for purposes of illustration only. In the figure the solid line 58 represents the analog value of the average on those output channels 16 which are coupled to the converter 18 by channels 14. The broken line 60 represents the actual updated average contained in the register 10.

In the situation outlined in FIGURE 2, let us consider that the register 10 presently carries an average of 90.00 represented in the natural binary code by 101101000. Let us assume further that input line 22 has applied thereto a new sample having a magnitude of 80.00. Under these conditions, the difference circuit 24 produces an analog output on line 26 of 10.00. At the same time it applies to the section 34 of the combiner 32 a signal indicating that the combiner should subtract the two inputs applied thereto. With an input of 10.00 the converter 36 produces an output of 000101000.

As has been explained hereinabove, channels 38 in applying this output to the combiner 32 shift the decimal point two places to the left thus effectively dividing the output by four. In other words, that output is applied to the combiner as an input of 000001010 or 2.5. In response to this input and to the present average input from delay elements 30, the combiner produces an output on channels 48 of 101011110 representing the updated average of 87.50.

It will be appreciated, of course, that the input signal actuates multivibrator 42 to provide a pulse applied by the channel 46 to the combiner to cause the combiner to operate. After a delay provided by the network 52, the updated average is transferred to the register 10 by the gate 50. After a slight delay determined by the networks 30 the new average becomes the present average applied to the combiner.

Let us assume that the next input sample has a magnitude of 81.00. This input is fed to the network 24 together with the analog of the representation stored in all but the two least significant places of the register 10. I do not use these two least significant places owing to the fact that the inputs do not have any fractional parts. In response to the new sample, the network 24 produces an output on line 26 having a magnitude of 6.00 and indicates to the section 34 that the inputs to the combiner 32 should be subtracted. Then converter 36 puts out the digital representation of six and channels 38 effectively divide this representation by four in applying it to the combiner 32. The combiner produces an output representing the new average of 86.00 or 101011000.

In response to successive inputs of 82, 83, 84, 85, 86, 87, 88, 89, 90, 91, 92 and 93, the average contained in the register 10 gradually is updated in the manner illustrated in FIGURE 2. In that figure, the solid line represents the input to the converter 18 while the broken line indicates the deviation of that value from the value stored in register 10 owing to the fractional parts in the two least significant places. It will be seen that at the input value of 84, the moving average has been brought down to a value at which it equals the input. From there on, in response to increasing input values, the moving average follows the values with a certain lag. I have shown after the input sample has reached a value of 93 how my arrangement reacts to inputs of the same value. After a number of such inputs have been applied to the system, ultimately the average reaches the input value. From that point on, I have illustrated the manner in which the system operates for gradually decreasing input samples. It will be seen again that the moving average lags the samples in that it is at all times greater than the gradually decreasing inputs.

Rather than giving a detailed explanation of the particular operation of the system, there is given below a table illustrating the values in various units of the system in response to sample inputs.

| Sample (ch. 22) | Present average D/A/C 18 | | Difference A/D/C 36 | | Difference/4 combiner 32 in | New average combiner 32 out | |
|---|---|---|---|---|---|---|---|
| | In | Out | In | Out | | | |
| 80 | 1011010 | 90 | −10 | 000101000 | 000001010 | 101011110 | 87.50 |
| 81 | 1010111 | 87 | −6 | 000011000 | 000000110 | 101011000 | 86.00 |
| 82 | 1010110 | 86 | −4 | 000010000 | 000000100 | 101010100 | 85.00 |
| 83 | 1010101 | 85 | −2 | 000001000 | 000000010 | 101010010 | 84.5 |
| 84 | 1010100 | 84 | 0 | 000000000 | 000000000 | 101010010 | 84.5 |
| 85 | 1010100 | 84 | +1 | 000000100 | 000000001 | 101010011 | 84.75 |
| 86 | 1010100 | 84 | +2 | 000001000 | 000000010 | 101010101 | 85.25 |
| 87 | 1010101 | 85 | +2 | 000001000 | 000000010 | 101010111 | 85.75 |
| 88 | 1010101 | 85 | +3 | 000001100 | 000000011 | 101011010 | 86.5 |
| 89 | 1010110 | 86 | +3 | 000001100 | 000000011 | 101011101 | 87.25 |
| 90 | 1010111 | 87 | +3 | 000001100 | 000000011 | 101100000 | 88.00 |
| 91 | 1011000 | 88 | +3 | 000001100 | 000000011 | 101100011 | 88.75 |
| 92 | 1011000 | 88 | +4 | 000010000 | 000000100 | 101100111 | 89.75 |
| 93 | 1011001 | 89 | +4 | 000010000 | 000000100 | 101101011 | 90.75 |
| 93 | 1011010 | 90 | +3 | 000001100 | 000000011 | 101101110 | 91.50 |
| 93 | 1011011 | 91 | +2 | 000001000 | 000000010 | 101110000 | 92.00 |
| 93 | 1011100 | 92 | +1 | 000000100 | 000000001 | 101110001 | 92.25 |
| 93 | 1011100 | 92 | +1 | 000000100 | 000000001 | 101110010 | 92.50 |
| 93 | 1011100 | 92 | +1 | 000000100 | 000000001 | 101110011 | 92.75 |
| 93 | 1011100 | 92 | +1 | 000000100 | 000000001 | 101110100 | 93.00 |
| 92 | 1011101 | 93 | −1 | 000000100 | 000000001 | 101110011 | 92.75 |
| 91 | 1011100 | 92 | −1 | 000000100 | 000000001 | 101110010 | 92.50 |
| 90 | 1011100 | 92 | −2 | 000001000 | 000000010 | 101110000 | 92.00 |
| 89 | 1011100 | 92 | −3 | 000001100 | 000000011 | 101101101 | 91.25 |
| 88 | 1011011 | 91 | −3 | 000001100 | 000000011 | 101101010 | 90.50 |

| Sample (ch. 22) | Present average D/A/C 18 In | Present average D/A/C 18 Out | Difference A/D/C 36 In | Difference A/D/C 36 Out | Difference/4 combiner 32 in | New average combiner 32 out | |
|---|---|---|---|---|---|---|---|
| 87 | 1011010 | 90 | −3 | 000001100 | 000000011 | 101100111 | 89.75 |
| 86 | 1011001 | 89 | −3 | 000001100 | 000000011 | 101100100 | 89.00 |
| 85 | 1011001 | 89 | −4 | 000010000 | 000000100 | 101100000 | 88.00 |
| 84 | 1011000 | 88 | −4 | 000010000 | 000000100 | 101011100 | 87.00 |

The operation of my system will readily be apparent from the detailed examples given above. With a certain average in the register 10, the analog equivalent of that average, save for the two least significant places, is applied to the difference network 24 by channel 20. In response to an input on channel 22, the network 24 produces an analog output signal on line 26 representing the magnitude of the difference. A signal on conductor 28 indicates whether the difference is positive or negative. That is, if the sample is less than the average, the signal on line 28 indicates a negative difference and instructs the combiner to subtract. Converter 36 converts the difference to digital form and the connections provided by channels 38 effectively divide the difference by four by shifting the decimal point two places to the left. Thus there are available at the inputs to combiner 32 an input representing the present average and an input representing one-fourth of the difference between the sample and the average. In response to the sample input, multivibrator 42 produces a pulse which triggers the combiner 32 to cause it to subtract one-quarter of the difference between the new sample and the present average from the present average to give an updated average on channels 48. Delay gate 50 passes the new average to register 10. After a short delay, the new average is passed to the combiner 32 to be available for combination with the other input to the combiner resulting from the next sample.

While I have illustrated a system in which I store an average of only four values in register 10 so that I divide the difference by four, it will readily be appreciated that I may store any number of samples which number is a power of 2 and in such instances, I divide the difference between the sample and the average by the number of stored values. For example, if I store 32 samples in the register 10, I divide the output from converter 36 by 32 by shifting the decimal point five places to the left.

It will be seen that I have accomplished the objects of my invention. I have provided apparatus for producing a moving digital average of a plurality of analog input signals. My apparatus provides an average which may be made up of as great a number of input signals as is desired. My digital filter produces its result in a rapid and expeditious manner.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for producing a moving digital average in response to a plurality of discrete analogue samples including in combination, a source of discrete analogue samples, a register for storing a digital representation of the average value of a number of said samples, a digital-to-analogue converter, means for feeding said representation to said converter to produce an analogue representation of said average, means responsive to said analogue representation and to an analogue input sample for producing an analogue signal of the difference between said input sample and said average, an analogue-to-digital converter, means for feeding said analogue difference signal to said analogue-to-digital converter to produce a digital difference signal, means responsive to respective digital inputs for algebraically combining said inputs, said combiner having respective input sections each having various places of significance, means for feeding said digital average representation to one of said input sections, means for feeding said digital difference representation to the other input section while shifting the places of significance of said representation down a number of places with respect to said combiner inputs effectively to divide said difference representation by a factor determined by the number of samples in said average and means coupling said algebraic combining means to said storing register.

2. Apparatus for producing a moving digital average in response to a plurality of discrete analogue samples including in combination, a source of discrete analogue samples, a register for storing a digital representation of the average value of a number of said samples, means responsive to said representation and to an analogue input sample for producing a digital representation of the difference between said sample and said average value, said difference representation having a number of places of significance, means for algebraically combining respective digital inputs fed thereto, said combining means having respective input sections each having a number of places of significance, and means for feeding said average value representation to one of said input sections, means for feeding said difference representation to the other input section with places of significance of said difference representation applied to input places of lesser significance by a number corresponding to the number of samples making up said stored digital representation and means coupling said algebraic combining means to said storing register.

3. Apparatus for producing a moving digital average of an input signal including in combination, a source of an input signal, an accumulator register for storing a digital representation, means responsive to said digital representation and to said input for producing a difference signal, means for dividing said difference signal by a factor greater than one, and means responsive to the divided difference signal for successively changing said digital representation by increments equal to said divided difference signal.

4. Apparatus as in claim 3 including means for actuating said means responsive to said divided difference signal at periodic intervals.

5. Apparatus as in claim 3 in which said signal is made up of a plurality of analogue samples.

6. Apparatus as in claim 3 in which said input signal is an analogue signal, said difference signal producing means comprising an analogue comparator and a digital-to-analogue converter responsive to said digital representation for providing an input to said comparator.

7. Apparatus as in claim 3 in which said input signal is an analogue signal, said difference signal producing means comprising an analogue comparator, a digital-to-analogue converter responsive to said digital representation for providing an input to said comparator, and an analogue-to-digital converter responsive to said comparator for providing a digital output in various places of significance.

8. Apparatus as in claim 3 in which said input signal is an analogue signal, said difference signal producing means comprising an analogue comparator, a digital-to-analogue converter responsive to said digital representation for providing an input to said comparator, and an analogue-to-digital converter responsive to said comparator for providing a digital output in various places of significance and in which said means responsive to said divided difference signal comprises a digital algebraic combiner having digital difference signal bit input places of significance, and in which said dividing means comprises means for applying the output of said analogue-to-digital converter to said combiner with the places of significance of said analogue-to-digital converter being applied respectively to difference signal bit input places of lesser significance.

References Cited

UNITED STATES PATENTS

| | | | |
|---|---|---|---|
| 3,182,181 | 5/1965 | Schumann | 235—164 |
| 3,193,669 | 7/1965 | Voltin | 235—164 |
| 3,194,950 | 7/1965 | Walls et al. | 235—154 |
| 3,317,717 | 5/1967 | Schumann | 235—150 |
| 3,192,371 | 6/1965 | Brahm | 235—183 |

MARTIN P. HARTMAN, *Primary Examiner.*